Jan. 23, 1968   G. OTTERBACH ETAL   3,364,962
APPARATUS FOR REMOVING BRANCHES FROM A TREE TRUNK
Filed Feb. 14, 1966
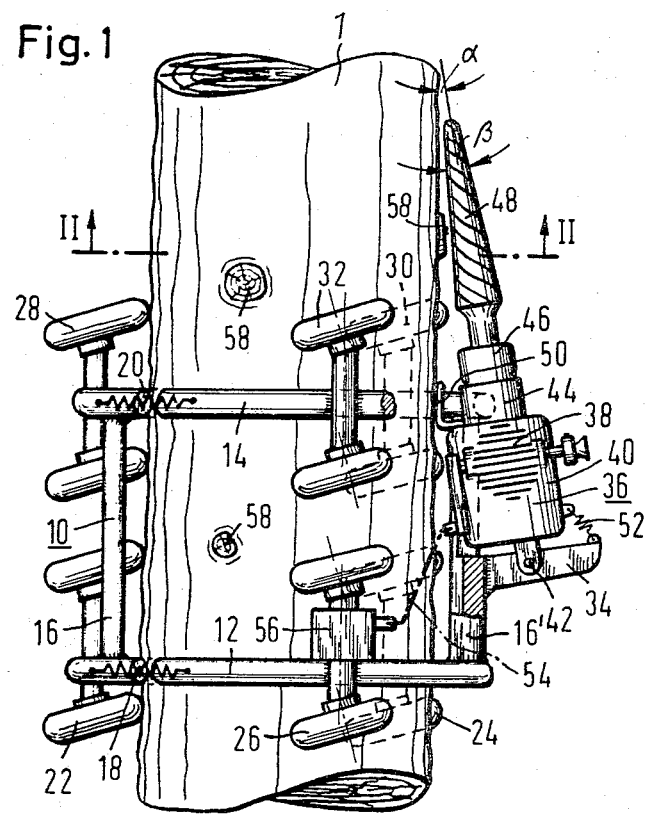
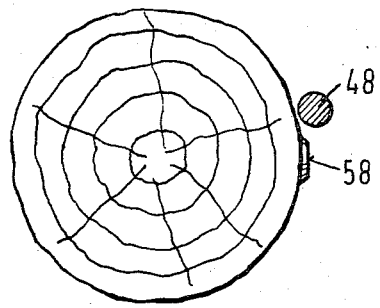
INVENTORS
Gerd Otterbach
Reinhard Kessler
By: Low and Berman
Agents United States Patent Office 3,364,962
Patented Jan. 23, 1968

3,364,962
APPARATUS FOR REMOVING BRANCHES
FROM A TREE TRUNK
Gerd Otterbach and Reinhard Kessler, Schweinfurt, Germany, assignors to Fichtel & Sachs A.G., Schweinfurt, Germany
Filed Feb. 14, 1966, Ser. No. 527,301
Claims priority, application Germany, Feb. 15, 1965, F 45.239
7 Claims. (Cl. 144—2)

This invention relates to forestry and logging equipment, and particularly to automatic apparatus for removing or lopping branches from tree trunks, especially those of standing trees.

It is known to remove branches from the trunks of standing or living trees by means of devices travelling over the upright surface of the tree in a path which has a circumferential component, and equipped with cutting devices for removing branches and the like projecting outward from the tree surface. The cutting devices of the prior art are either circular saws or chain saws which inherently tend to cut a planar kerf. Because of the circumferential component of cutting tool movement, the cutting tool is subjected to transverse or bending stresses which may cause jamming and damage to the tool. The probability of tool jamming in the known devices is a direct function of the thickness of the branch to be lopped off and an inverse function of the trunk diameter.

The object of the invention is the provision of apparatus for removing the branches from tree trunks whose cutting tool is not subjected to the afore-mentioned transverse or bending stresses, and whose operation is free of the jamming hazard inherent in the known devices.

Another object is the provision of branch lopping apparatus which cuts the remaining stub to a minimal length, yet avoids damage to the bark of the tree.

A basic feature of this invention is the use of a milling cutter, preferably an end-milling cutter of conical shape, as a lopping tool. Other features, additional objects, and many of the attendant advantages of this invention will be readily appreciated as the same becomes better understood by reference to the following detailed description when considered in connection with the accompanying drawing wherein:

FIG. 1 shows an apparatus of the invention in operative position on a partially illustrated tree trunk, the view being in elevation, and portions of the apparatus being broken away; and FIG. 2 shows the tree and apparatus of FIG. 1 in section on the line II—II.

Referring not to the drawing in detail, there is seen the upright, roughly cylindrical trunk 1 of a living tree which is girdled by a frame 10. The frame 10 has a lower split loop 12 and an upper split loop 14 connected by upright members 16, 16'. The member 16, is a bar whose ends are fixedly fastened to respective portions of the loops 12, 14 whereas the member 16' is Y-shaped or forked. The two parts of each loop are releasably connected by a helical tension spring 18, 20, and one part of each loop is hingedly attached to the forked member 16' in a manner not further illustrated so that the frame 10 may be placed about the tree trunk 1 and removed from the same.

The frame 10 supports six wheel assemblies, the assemblies 22, 24, 26 being approximately equiangularly spaced about the common axis of the tree trunk 1 and the frame 10 on the lower loop 12 of the latter, and the wheel assemblies 28, 30, 32 being similarly attached to the upper frame loop 14. The paired wheels of each assembly are mounted for rotation about an axis which is obliquely inclined relative to a tangent drawn on the nominally cylindrical tree surface at the point of contact with each wheel, the angle of inclination being the same for each of the twelve wheels so that the frame 10 is guided by the wheels in a helix about the axis of the tree when the wheels are rotated.

A bracket 34 fixedly attached to the upright member 16' and extending radially outward therefrom supports a motor assembly 36 attached to the bracket 34 by a pivot pin 42 whose axis is approximately parallel to a corresponding tangent drawn on the nominal surface of the tree.

The assembly includes a crankcase 40 which carries the cylinder 38 of an associated internal combustion engine and encloses a speed-reducing gear transmission coupled to the crankshaft of the engine and not shown in the drawing. The engine shaft is also coupled in a conventional manner, not shown, to a second output transmission 44 which drives a chuck 46 at a relatively high rotary speed. The shank of a conical end milling cutter 48 is coaxially clamped in the chuck 46.

Its weight tends to tilt the assembly 36 about the pivot pin 42 between the forked ends of the member 16' toward the surface of the tree trunk 1, and a helical compression spring 52 further biases the conically tapering cutting face of the milling cutter 48 toward the tree surface, the spring being interposed between the bracket 34 and the crankcase 40. A stop 50 mounted on the crankcase 40 prevents engagement of the milling cutter face with the tree bark. The stop 50 is preferably adjusted on the crankcase 40 in such a manner that the axis of rotation of the cutter and the nominally cylindrical tree surface define an angle $\alpha$ which is one half of the apex angle $\beta$ of the cutter 48.

The motor 38 actuates the wheels of the assembly 26 through a drive train which includes the afore-mentioned nonillustrated reducing gear transmission in the crankcase 40, a conventionally shown flexible shaft 54, and a transmission or coupling 56 which reverses the direction of rotation of the wheels on the assembly 26 after a predetermined number of revolutions. Since automatically reversing couplings or transmissions and the universal joints which connect the coupling 56 with the wheels of the assembly 26 are known in themselves, these elements have not been illustrated in detail.

The afore-described apparatus is operated as follows:

The frame 10 is placed about an upright tree trunk after releasing the springs 18, 20, and swinging the parts of the loops 12, 14 apart as needed. The loops are then closed and the wheel assemblies maintain the frame 10 in the illustrated position. A suitably selected conical milling cutter 48 is inserted in the chuck 46, and the stop 50 is adjusted, if necessary, to make the portion of the cutting face nearest the tree surface approximately parallel to the latter while keeping it at a desired distance.

The engine 38 is started, and the driven wheels of the wheel assembly 26 move the frame 10 and the motor assembly 36 in a helical upward path about the axis of the tree while the cutter 48 is rapidly rotated about its axis. When the cutter meets a branch projecting from the tree trunk 1, it cuts the branch to a stub 58 whose cut surface is cylindrical about the tree axis, and which may be extremely short if the stop 50 is properly set or the apex angle of the cutter 48 is properly selected for cooperation with the stop 50.

As the branch lopping apparatus helically ascends the tree trunk, the engaged diameter of the latter decreases, and the loops 12, 14 are contracted by the springs 18, 20, thereby maintaining proper engagement between the wheel assemblies and the tree surface and proper alignment between the surface of the tree and of the milling cutter.

It is common practice to lop the branches of living trees to a certain height in order to improve the quality of the timber. The reversing coupling or transmission 56 is set or selected to reverse the direction of movement of the associated wheels when the apparatus reaches the desired height on the tree. The apparatus then automatically descends to the ground in a helical path, the engine is stopped, and the entire device is released from the tree trunk by opening the loops 12, 14.

The milling cutter employed in the branch lopping apparatus of the invention is not subjected to the transverse or bending stresses inherent in similarly employed circular or chain saws, and thus does not jam regardless of the diameters of the trunk or of the branches to be cut. It is thus more reliable in its operation and more generally applicable without requiring adjustment or maintenance work.

The apparatus and its operation have been described with reference to the removal of branches from standing or living trees, but it will be appreciated that the apparatus lends itself to other field operations in forestry and logging, or may be modified for such other operations.

It should be understood, therefore, that the foregoing disclosure relates only to a preferred embodiment of the invention, and that it is intended to cover all changes and modifications of the example of the invention herein chosen for the purpose of the disclosure which do not constitute departures from the spirit and scope of the invention set forth in the appended claims.

What is claimed is:

1. Apparatus for removing branches from a tree trunk comprising, in combination:
   (a) a support;
   (b) guide means for guiding said support in a substantially helical path about the surface of a tree trunk of approximately circular cross section;
   (c) first drive means for moving said support in said path;
   (d) a milling cutter having a cutting face, said face having an axis;
   (e) mounting means mounting said said cutter on said support for engagement of said cutting face with portions of said tree projecting from said surface thereof;
   (f) second drive means for rotating said milling cutter about said axis;
   (g) actuating means connected to said first and second drive means for rotating said cutter during movement of the same with said support in said path.

2. Apparatus as set forth in claim 1, wherein said actuating means include a single motor operatively connected to said first and second drive means.

3. Apparatus as set forth in claim 1, wherein said cutting face is substantially conical about said axis and defines an apex angle, said mounting means including means for maintaining an angle approximately equal to one half of said apex angle between said axis and said surface during rotation of said milling cutter and during said movement thereof in said path.

4. Apparatus as set forth in claim 1, wherein said second drive means include chuck means releasably connecting said cutter to said actuating means.

5. Apparatus as set forth in claim 1, wherein said mounting means include a carrier, a pivot connecting said carrier to said support for tilting movement about a pivot axis substantially parallel to a tangent on said surface; yieldable means biasing said carrier for movement of said cutting face toward said surface; and stop means for preventing engagement of said cutting face with said surface.

6. Apparatus as set forth in claim 5, wherein said cutting face is substantially conical and defines an apex angle, said stop means including means for maintaining an angle approximately equal to one half of said apex angle between said axis of the cutting face and said surface during rotation of said milling cutter and during movement thereof in said path.

7. Apparatus as set forth in claim 6, wherein said actuating means include a single motor operatively connected to said first and second drive means, said second drive means including chuck means for releasably connecting said milling cutter to said motor, and said first drive means including a reversing transmission.

References Cited

UNITED STATES PATENTS

| 2,487,392 | 9/1949 | Whitaker | 144—2 |
| 3,030,986 | 4/1962 | Longert | 144—2 |
| 3,315,714 | 4/1967 | Meier | 144—2 XR |

WILLIAM W. DYER, JR., *Primary Examiner.*